United States Patent
Oroskar et al.

(10) Patent No.: US 8,254,874 B1
(45) Date of Patent: Aug. 28, 2012

(54) VARIABLE PERSISTENCE DELAY FOR MOBILE STATIONS RECEIVING CONCATENATED PAGES

(75) Inventors: Siddharth S. Oroskar, Overland Park, KS (US); Sachin R. Vargantwar, Overland Park, KS (US); Deveshkumar Rai, Overland Park, KS (US); Debasish Sarkar, Irvine, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 343 days.

(21) Appl. No.: 12/579,116

(22) Filed: Oct. 14, 2009

(51) Int. Cl.
*H04M 11/04* (2006.01)
*H04W 4/00* (2009.01)

(52) U.S. Cl. .................. 455/404.1; 455/432.3

(58) Field of Classification Search .............. 455/404.1, 455/432.3
See application file for complete search history.

(56) References Cited

U.S. PATENT DOCUMENTS

| | | | |
|---|---|---|---|
| 6,374,099 B1 * | 4/2002 | Bi et al. | 455/404.1 |
| 6,535,736 B1 | 3/2003 | Balogh et al. | |
| 7,729,696 B2 * | 6/2010 | Harris et al. | 455/432.3 |
| 2007/0076682 A1 | 4/2007 | Kim et al. | |

* cited by examiner

*Primary Examiner* — Kent Chang
*Assistant Examiner* — Kuo Woo

(57) ABSTRACT

A method and system is disclosed for variable persistence delay in access terminals receiving a concatenate page message. When an access terminal (e.g., a mobile station or wireless communication device) receives a page message that it determines is part of a concatenated page message, the access terminal will compute a backoff delay and a persistence delay according to delay parameters selected based upon the determination. According to an example embodiment, the access terminal will use the place-order of the received page record in the concatenation of page records in the page message to select values of the delay parameters. Other access terminals receiving the same concatenated page message will similarly select delay parameters. By associating the delay parameter values with place-order in the concatenated page message, each access terminal may used different values, and thereby compute different delays.

26 Claims, 6 Drawing Sheets

VARIABLE PERSISTENCE DELAY FOR MOBILE STATIONS RECEIVING CONCATENATED PAGES

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

A subscriber (or user) in a service provider's wireless communication system accesses the system for communication services via an access terminal, such as a cellular telephone, pager, or appropriately equipped portable computer, for instance. When an access terminal is positioned in a cell, the access terminal (also referred to herein by "AT") communicates via an RF air interface with the BTS antenna of the cell. Consequently, a communication path or "channel" is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As a subscriber at an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or other coverage area) to a "target" cell or sector.

In some wireless communication systems or markets, a wireless service provider may implement more than one type of air interface protocol within a single system. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). In such a "hybrid system," an access terminal might not only hand off between coverage areas under a common air interface protocol (e.g., between IS-2000 sectors) but may also hand off between the different air interface protocols, such as between IS-2000 and IS-856. An access terminal capable of communicating on multiple air interface protocols of a hybrid system is referred to as a "hybrid access terminal." Handoff between different air interface protocols (or, more generally, between different access technologies) is known as "vertical" handoff.

OVERVIEW

In order for an access terminal in a wireless communication system to establish a communication session, such as a call or a data session, the access terminal must first acquire a traffic channel from the RAN. An access terminal seeks to acquire a traffic channel by transmitting one or more access attempt messages over an access channel to its serving base station and waiting for a response. Because the access channel is generally shared among possibly multiple access terminals, interference or "collisions" of access attempt messages can occur when multiple ATs seek access at the same or nearly the same time. Collisions of access attempt messages can lead to delays in call setup or session setup times, and adversely affect overall system performance. To help avoid collisions, each access terminal uses procedures that control the timing of transmissions of access attempt messages. The procedures differ slightly depending on whether the AT is responding to a message from the RAN (e.g., a message alerting the AT that another party or entity desires to communicate with it), or originating a request for access (e.g., initiated by a user of the AT).

More specifically, during an access attempt the AT transmits a one or more "access probes" in a sequence to the base station, waiting for a partially-random delay time between each transmission in order to listen for an acknowledgement from the base station. The access channel is configured for transmissions during regular, fixed-duration time slots, referred to as "access channel slots." Each access probe is transmitted during one access channel slot, and each successive probe in a sequence is transmitted at a higher power level than the preceding probe. An access probe corresponds to an "access response" message if sent in response to a message from the RAN; an access probe corresponds to an "access request" message if sent as an unsolicited request for access.

If an acknowledgment is received in response to a given probe within a fixed delay after transmission, the AT discontinues further probe transmissions in the sequence. If an acknowledgment is not received within the fixed delay, the AT waits an additional random "inter-probe" delay time, measured in units of access channel slots, and then transmits the next probe at a higher power level than the previous probe. Waiting the random inter-probe delay time is one of the procedures used to help avoid collisions. Once the base station acknowledges an access probe, it assigns a traffic channel to the AT, and call or session setup is established using the assigned channel. If the AT does not receive an acknowledgement from the base station after transmitting all of the access probes of a given sequence, the AT may then attempt access with one or more additional probe sequences as necessary until it either receives an acknowledgment and a traffic channel assignment, or the access attempt via the base station fails.

In the event of failure, the AT may seek access from an alternate base station (or sector).

When more than one sequence of access probes is required, the AT waits a random "inter-sequence" delay time between the final probe of the last (unsuccessful) sequence and the first probe of the next sequence. As with the random inter-probe delay between individual probes of a given sequence, the random inter-sequence delay between sequences, also measured in units of access channel slots, is aimed at avoiding collisions of access probes transmitted by different ATs. Under one or more standards of operation, including IS-2000, the random inter-sequence delay used between probe sequences of an access response is computed differently than the random inter-sequence delay between probe sequences of an access request. Specifically, the random inter-sequence delay between probe sequences of an access response is a random "backoff" delay, computed by randomly selecting an integer number of access channel slots between a minimum integer number and a maximum integer number. The random inter-sequence delay between probe sequences of an access request is the random backoff delay plus an additional "persistence" delay computed by repeatedly performing a probabilistic test and accumulating delay according to the outcome of each run of the test. The test, referred to as a "persistence test," yields a random outcome of "success" or "failure" on any given run, and is performed repeatedly until the first occurrence of success, while a fixed delay equal to one access channel slot is waited for each failure occurrence preceding the success. The persistence delay is then the sum of the access channel slots corresponding to all the failure outcomes.

The rationale for adding a persistence delay for access requests is that, while the RAN can impose some influence over the timing of access responses by controlling the timing of the RAN messages that solicit access responses, the RAN has no such influence over the timing of access requests since they are unsolicited and made by access terminals on a statistically random basis. Persistence delay emulates a form of blocking, and can help prevent or at least mitigate oversubscription to any given access channel by ATs making access requests at random times. In practice, an AT computes both the random backoff and the persistence delay in units of access channel slots using parameters set by the RAN and communicated to the AT in one or another system message (e.g., an "Access Parameters Message"). These parameters include a minimum and maximum backoff delay used to define a range within which the AT randomly selects a backoff delay for any given access attempt, and a persistence threshold that the AT uses in the persistence test.

Although the RAN can control the timing of its transmission of individual messages, such as pages, that solicit responses from ATs, in some operational circumstances, the RAN may also sometimes transmit a single "compound" message that includes an aggregation or a concatenation of pages to a group of ATs. In turn, all of the ATs in the group may be prompted to respond at nearly the same time, increasing the likelihood of access response collisions as a consequence. Therefore, in instances when the RAN transmits a "concatenated page" message, or other form of compound message that can prompt nearly simultaneous responses from a plurality of access terminals, it would be desirable to cause the plurality of access terminals to randomize the times of their response transmissions in such a way as to compensate for their nearly simultaneous receipt of the concatenated message. It would also be desirable to cause each access terminal of the plurality to adjust the access channel parameters in such a way as to increase the effectiveness of the random transmission delays in avoiding or mitigating collisions.

Accordingly, embodiments of the present invention provide a method and system for variable persistence delay for access terminals receiving concatenated page messages. More particularly, when an access terminal receives a "response-expected" message from the RAN to which the AT needs to respond with an access response message, and the access terminal makes a determination that the received response-expected message is one of a plurality of response-expected messages in a single, compound message directed to a corresponding plurality of access terminals, the access terminal will compute a backoff delay and a persistence delay using parameters that are based on the determination. The access terminal will use the computed delays when transmitting its access response messages. Advantageously, the collisions between access response messages from among the plurality of access terminal may be avoided. Moreover, the AT may carry out the actions responsive to the determination, without additional input from the RAN.

Hence, in one respect, various embodiments of the present invention provide, in an access terminal configured to operate in a wireless communication system that includes a base station, a method comprising: at the access terminal, receiving a particular response-expected message from the base station, wherein a response-expected message is a message to which any given access terminal responds by transmitting an access attempt message, an access attempt message being a request by the any given access terminal for wireless access; at the access terminal, making a determination that the particular response-expected message is one of a plurality of response-expected messages in a single, compound message transmitted to a corresponding plurality of access terminals, the access terminal being one of the plurality of access terminals; at the access terminal, responsive to the determination: selecting a maximum delay, randomly selecting a first backoff delay between a minimum delay and the maximum delay, and selecting a particular threshold number between a minimum number and a maximum number; at the access terminal, after waiting for a time equal to at least the first backoff delay, repeatedly making a random selection of a number between the minimum number and the maximum number until an occurrence of a random selection that yields a value smaller than the particular threshold number, while also waiting for a time equal to a test delay between making each repeated, random selection; and at the access terminal, transmitting a particular access attempt message on an air interface communication link to the base station after the occurrence.

In another respect, various embodiments of the present invention provide, in an access terminal configured to operate in a wireless communication system that includes a base station, a method comprising: at the access terminal, receiving a particular response-expected message in a compound message from the base station, the compound message comprising a plurality of response-expected messages including the particular response-expected message, each directed to a different one of a plurality of access terminals including the access terminal, and each requiring the different one of the plurality of access terminals to transmit a respective access attempt message to the base station; at the access terminal, responsive to making a determination that the particular response-expected message was received in the compound message, computing a first backoff delay according to a backoff algorithm that is based on the determination, and computing a first persistence delay according to a persistence algorithm that is based on the determination; and at the access terminal, after waiting a time equal to at least the sum of the first backoff delay and the first persistence delay, transmitting a particular access attempt message on an air interface communication link to the base station.

In still another respect, various embodiments of the present invention provide an access terminal configured to operate in a wireless communication system that includes a base station, the access terminal comprising: means for receiving a particular response-expected message in a compound message from the base station, wherein the compound message comprises a plurality of response-expected messages including the particular response-expected message, each directed to a different one of a plurality of access terminals including the access terminal, and each requiring the different one of the plurality of access terminals to transmit a respective access attempt message to the base station; means for making a determination that the particular response-expected message was received in the compound message, and responsive to the determination: computing a first backoff delay according to a backoff algorithm that is based on the determination, and computing a first persistence delay according to a persistence algorithm that is based on the determination; and means for waiting a first total delay time equal to at least the sum of the first backoff delay and the first persistence delay, and after waiting the first total delay time, transmitting a particular access attempt message on an air interface communication link to the base station.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. Under IS-2000, packet-data communications are conventionally referred to as "1X-RTT" communications, also abbreviated as just "1X." Packet-data communications under IS-856 are conventionally referred to as "EV-DO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
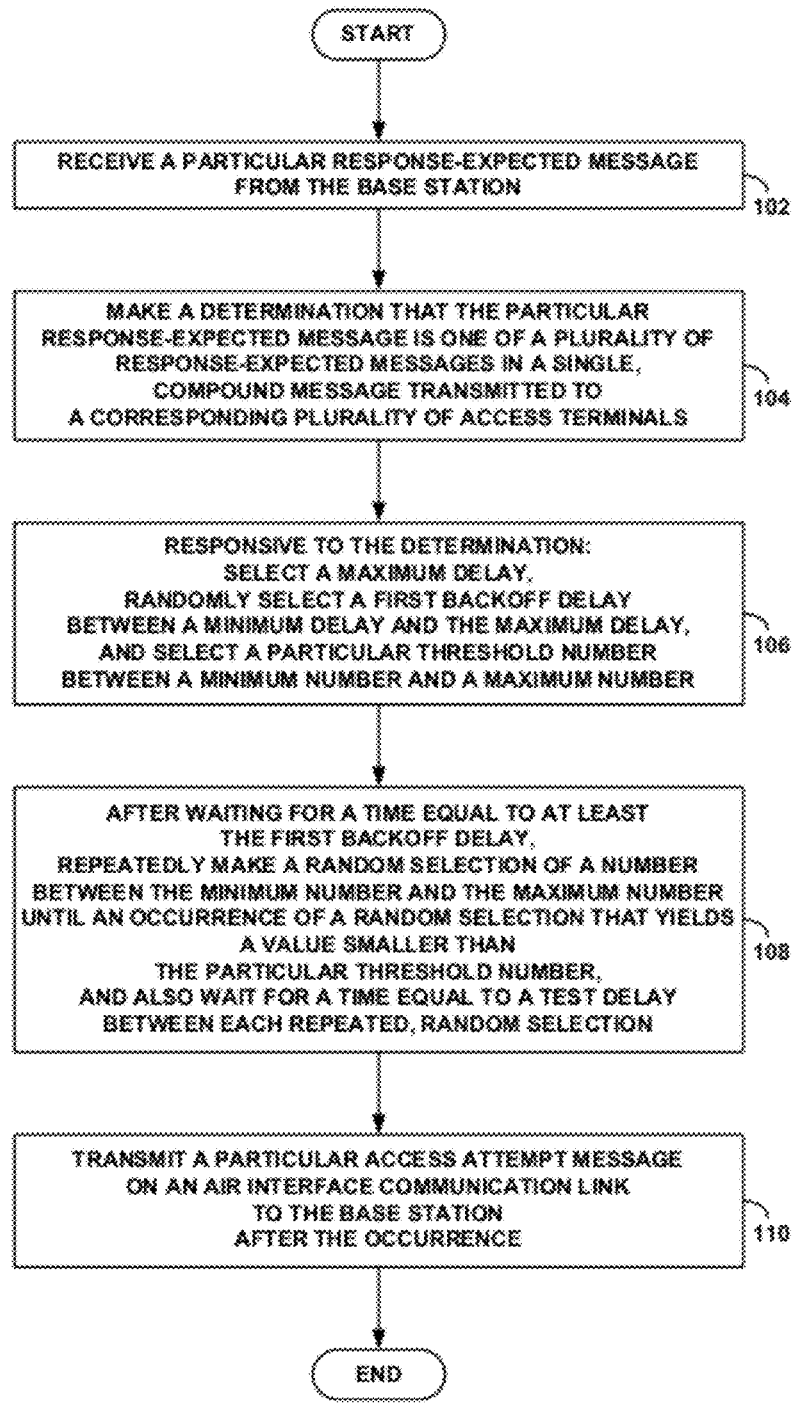
FIG. 1 is a flowchart depicting an example embodiment of a method variable persistence delay for an access terminal receiving a concatenated page.

FIG. 1 is a flowchart depicting an example embodiment of a method of variable persistence delay for an access terminal receiving a concatenated page. By way of example, the steps of the flowchart could be implemented in an access terminal that operates according to a CDMA family of protocols in a wireless communication system that includes one or more base stations (e.g., as part of one or more RANs). At step 102, the AT receives a particular "response-expected" message from a base station. As used herein, a response-expected message refers generically to a type of a message to which the base station (or other RAN element) expects a response (from the AT to which the message was sent). In this sense, a response-expected message solicits a response from an AT, and an AT is prompted to take actions to generate and send a response when the AT receives a response-expected message. More specifically, an access terminal responds to a response-expected message by transmitting an "access attempt message." An access attempt message is a form of request by the access terminal to gain wireless access from the RAN, and in particular to acquire a traffic channel for a call or other form of communication session.

In a wireless communication system that operates according to a CDMA family of protocols, an example of a response-expected message is a page message sent to alert the AT that another entity (e.g., another access terminal) is seeking to establish a communication with the AT. The AT may respond to such a page by taking actions to establish a traffic channel via the base station in order to support the requested communication. Without loss of generality with respect to the example embodiment, a response-expected message will be taken to be a page message. It will be appreciated, however, that other types of messages from the RAN (or a RAN element) to an AT may be considered as response-expected messages as defined herein.

At step 104, the AT makes a determination that the particular response-expected message is one of a plurality of response-expected messages in a single, compound message transmitted to a corresponding plurality of access terminals, wherein the access terminal is one of the plurality of access terminals. In accordance with the example embodiment, each of the plurality of response-expected messages could be a page message directed to a different one of the plurality of access terminals, the particular response-expected message thus being a particular page message directed to the AT. Further, the compound message could be a "concatenated" page message that includes a concatenation of the plurality of page messages. As such, making the determination at step 104 could comprise determining that the particular page message is one page message of a concatenated page message. Correspondingly, receiving the particular response-expected message (step 102) could comprise receiving the concatenated page message and retrieving the particular page message from the received concatenated page message.

In practice, a concatenated page message (or more generally, a compound message comprising a plurality of response-expected messages) is transmitted by the base station (or other RAN element) to each of the plurality of access terminals at the same time. Thus, except for differences among propagation delays to the different access terminals, each of the access terminals will receive the concatenated page message at the same time. Since each page message is typically directed to a different one of the plurality of access terminals, and since each page message solicits a response from a recipient access terminal, transmission of a concatenated page message can lead to an operational condition in which all of the access terminals of the plurality are prompted to respond at the same (or nearly the same) time by transmitting respective access attempt messages. When two or more access terminals attempt to send access attempt messages at the same time, however, their respective transmissions may interfere with each other. Consequently, a concatenated page message can give rise to an increased chance of interference of response attempts. In accordance with the example embodiment, the AT advantageously adapts how it times its response messages to account for having received the particular page message in a concatenated page message.

More particularly, in response to the making the determination at step 104, at step 106 the AT selects a maximum delay, randomly selects a first backoff delay between a minimum delay and the maximum delay, and selects a particular threshold number between a minimum number and a maximum number. As will be described, the maximum and minimum delays, the first backoff delay, the maximum and minimum numbers, and the particular threshold number are parameters used by the AT for timing the transmission of one or more response messages to the RAN. Making the selection of these parameters in response to the determination (at step 104) that the particular page message is one of a plurality of page messages received in a concatenated page message thereby couples the manner in which the AT times its response messages to an operational condition in which a plurality of access terminals are prompted to respond at the same (or nearly the same) time.

In accordance with the example embodiment, the place-order of the particular page message in the concatenated page message will be used by the AT as a basis for selecting the transmission timing parameters. Specifically, the concatenation of the plurality of page messages is arranged in an order from a first page message to a last page message, and the particular page message occupies a particular place in the order (e.g., third, fourth, fifth, etc.). In retrieving the particular page message from the concatenated page message, the AT will also determine the place in the order (place-order). The AT may then base its selection of maximum delay and particular threshold number on the determined place in the order. The AT could also select other parameters, including minimum delay and maximum and minimum numbers, based on the determined place-order. For example, the AT can maintain a table of parameter values in its memory, wherein the table comprises a list of table entries, and each table entry comprises a set of values for maximum and minimum delay, maximum and minimum number, and particular threshold. The AT could choose a particular table entry according to the place-order of the particular page message, and set the parameters according to the values of the chosen entry.

In further accordance with the example embodiment, the AT will randomly select the first backoff delay by choosing a delay value at random from a uniform distribution of delay values between the minimum delay and the maximum delay. Hence, the expected value of the first backoff delay is midway in the range between the minimum delay and the maximum delay. Because the minimum delay and the maximum delay are selected at step 106 based on the determination made at step 104, the expected value of the first backoff delay—that is, statistically expected based on a random selection—will be correspondingly and advantageously coupled to the determination.

In practice, the selection by the AT will be carried out by one or another form of computer processor. As such, it will be appreciated that a "random" selection, or other action involving computing or determining a "random" number, is not truly random in a mathematical sense, but is rather "pseudo-random" since a processor generally operates in a deterministic manner. A pseudo-random number or process is one that displays mathematical properties substantially similar to truly random numbers or processes, but is computed according to a deterministic process. Unless otherwise noted, the term "random" as applied herein to an action or computation performed by a processor in a device (e.g. an access terminal) will be understood to mean "pseudo-random," and the mathematical properties of a truly random, corresponding number or process will be assumed largely valid.

At step 108, the AT waits for a time equal to the first backoff delay, then computes and waits an additional delay based on the particular threshold number selected at step 106. Specifically, the particular threshold number is a "persistence threshold" $P_{thresh}$ and the additional delay is a "persistence delay" PD. The persistence delay is computed by selecting a number $P_{ran}$ at random repeatedly until a first occurrence of a value smaller than the persistence threshold. That is, until the first occurrence of $P_{ran} < P_{thresh}$. Each random selection is made with uniform probability within a range between the minimum number and the maximum number parameters. For each selection that yields a value at least as large as the persistence threshold, a fixed delay $\Delta t_s$ is incurred. The computation is complete upon the first occurrence of $P_{ran} < P_{thresh}$, and yields a total persistence delay equal to $\Delta t_s$ multiplied by the number of random selections that yielded values at least as large as the persistence threshold (i.e., the number of selections preceding the first occurrence of a value smaller than the persistence threshold). In practice, $\Delta t_s$ is incurred after each random selection that yields a value at least as large as the persistence threshold, so that the total persistence delay is incurred by the time the computation of the delay is complete.

In accordance with the example embodiment, making the selection of the particular threshold number (i.e., persistence threshold) on the basis of the determination made at step 104 advantageously couples the computed (and incurred) persistence delay to the determination. More particularly, without any loss of generality with respect the example embodiment, the minimum number can be taken to be zero and the maximum number can be taken to be one. Hence, $P_{thresh}$ is a number in the range [0,1], wherein the exact value is based on the determination made at step 104. Since each random selection of $P_{ran}$ is made with uniform probability also in the range [0,1], the probability that any one selection will yield a value smaller than the persistence threshold is just equal to the persistence threshold. In other words, $\Pr\{P_{ran} < P_{thresh}\} = P_{thresh}$. Taking $K_P$ to be the number of times a random selection of $P_{ran}$ is made until the first occurrence of $P_{ran} < P_{thresh}$, the persistence delay for any given computation can be written as $PD = \Delta t_s \times K_P$.

For any given computation of PD, the probability that $K_P$ takes on a particular value k is given by $\Pr\{K_P = k\} = (1-$ $P_{thresh})^k \times P_{thresh}$, for k=1, 2, 3, . . . . It can be shown that the expected value of $K_P$, $E[K_P]$, is thus given by $E[K_P]=\Sigma_{k=0}^{\infty}(k \times Pr\{K_P=k\})=(1-P_{thresh})/P_{thresh}$. Hence, the expected value of the persistence delay is given by $E[PD]=\Delta t_s \times (1-P_{thresh})/P_{thresh}$. Accordingly, since selection of the particular persistence threshold selected at step 106 is based on the determination made at step 104, the expected value of the persistence delay will be correspondingly and advantageously coupled to the determination.

At step 110, after waiting for a time equal to at least the sum of the first backoff delay and the persistence delay, the AT transmits a particular access attempt message on an air interface communication link to the base station. Under a CDMA family of protocols, any given access attempt message is an "access probe," and an access terminal transmits access probes on an "access channel" on the reverse link to the base station (or other RAN element). While a base station can support more than one access channel, any one access channel is generally shared among multiple access terminals. Each access channel is configured for transmissions during successive time slots, referred to as "access channel slots." Accordingly, transmitting the particular access attempt message (step 110) comprises transmitting a particular access probe on the access channel during one access channel slot.

In further accordance with the example embodiment, the fixed delay $\Delta t_s$ is equal to one access channel slot. Additionally, the backoff delay (as well as the range defined by the minimum and maximum delays) is also measured in units of access channel slots. Hence, the total of the backoff delay and the persistence delay that the AT waits prior to transmitting the particular access probe is measured in an integer number or access channel slots. Since this amount of total delay is coupled to the determination at step 104 that the page message to which the AT is responding is part of a concatenated page message to a plurality of access terminals including the AT, the AT may apply a delay that is in a sense coordinated with respective delays applied by the other access terminals of the plurality. Advantageously, the likelihood of interference among access probes transmitted by the plurality of access terminals may thereby be reduced.

As describe, the method illustrated by way of example in FIG. 1 applies to transmission of the first access probe after receipt of a concatenated page message by an access terminal. Under a CDMA family of protocols, an access probe is typically transmitted as part of a sequence of access probes, each successive probe of a given sequence being transmitted only if no acknowledgement to the preceding probe is received from the base station. Additionally, an access terminal may transmit more than one sequence of access probes until an acknowledgement is received. Although not explicitly described, the method illustrated in FIG. 1 applies to the initial access probe of each of possibly multiple sequences of access probes transmitted by the AT in response to a given concatenated page message. Thus, it applies to the first probe after receipt of a concatenated page message by the AT (i.e., the initial probe of the first sequence), the initial probe of a possible second sequence, the initial probe of a possible third sequence, and so on.

It will be appreciated that the steps of FIG. 1 are illustrated by way of example, and that additional and/or alternative steps or alternative ordering of steps could be carried in order to implement variable persistence delay for an access terminal receiving a concatenated page.

Figure 2:
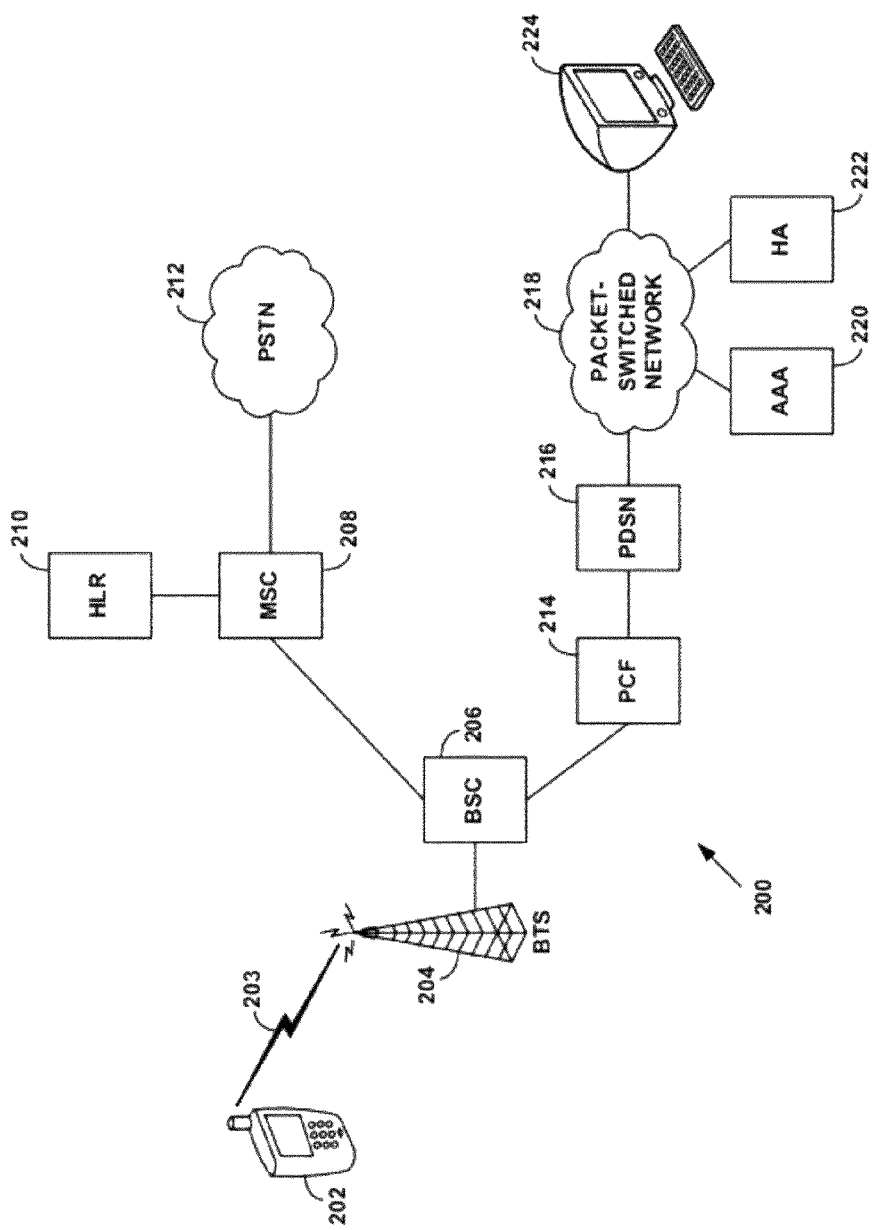
FIG. 2 is a simplified block diagram of a wireless communication system in which an example embodiment of variable persistence delay for an access terminal receiving a concatenated page could be carried out.

FIG. 2 shows a simplified block diagram of a wireless communication system 200 that can be operated by a wireless service provider, and in which an exemplary embodiment of a method variable persistence delay for an access terminal receiving a concatenated page can be employed. Subscribers engage in communications in the wireless communication system via access terminals, whereby access terminals provide a physical basis for interfacing with the communication system, and subscribers are associated with respective access terminals according to subscriber account information that is maintained by the system in one or more data bases. Accordingly, subscribers are represented by their respective, associated access terminals in FIG. 2. As shown, access terminal AT 202 communicates over an air interface 203 with a BTS 204, which is then coupled or integrated with a BSC 206. Transmissions over air interface 203 from BTS 204 to AT 202 represent the "forward link" to the access terminal, while transmissions over interface 203 from AT 202 to BTS 204 represent the "reverse link."

BSC 206 is connected to MSC 208, which acts to control assignment of air traffic channels (e.g., over air interface 203), and provides access to wireless circuit-switched services such as circuit-voice and circuit-data (e.g., modem-based packet data) service. As represented by its connection to PSTN 212, MSC 208 is also coupled with one or more other MSCs, other telephony circuit switches in the operator's (or in a different operator's) network, or other wireless communication systems, thereby supporting user mobility across MSC regions, roaming between systems, and local and long-distance landline telephone services. Also connected to MSC 208 is home location register (HLR) 210, which supports mobility-related aspects of subscriber services, including dynamic tracking of subscriber registration location and verification of service privileges.

As shown, BSC 206 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air traffic channel over its air interface, an access terminal (e.g., AT 202) may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a communication interface, a tone detector, a processing unit, and data storage, all of which may be coupled together by a system bus or other mechanism.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CDMA COMMUNICATIONS a. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number ("PN") offset. Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

With the arrangement described above, an access terminal can engage in cellular voice and/or in packet-data (1X-RTT) communications. Referring again to FIG. 2, and taking an originating call from AT 202 as an example, AT 202 first sends an origination request over air interface 203 and via the BTS 204 and BSC 206 to MSC 208. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 216 by way of PCF 214. The PDSN 216 and access terminal 202 then negotiate to establish a data link layer connection, such as a point to point protocol (PPP) session. Further, the PDSN 216 sends a foreign agent advertisement that includes a challenge value to the access terminal, and the access terminal responds with a mobile-IP registration request (MIP RRQ), including a response to the challenge, which the PDSN forwards to HA 222. The HA then assigns an IP address for the access terminal to use, and the PDSN passes that IP address via the BSC to the access terminal.

An access terminal that has no active data session or voice call (i.e., no assigned traffic channel), but is otherwise operational in an IS-2000 system, is said to be in an "idle" state or mode. While in the idle state, the access terminal periodically scans the 1X interface for communication from the wireless communication system. More specifically, the AT monitors the paging channel for page messages from the base station. Page messages are used to send the access terminal information, alerts, and requests during times when the AT isn't engaged in any 1X-based communication (i.e., when the AT is idle). For instance, the AT is alerted of an incoming call via a page message.

In practice, a wireless communication system implements multiple paging channels (typically, up to seven), each subdivided into 2,048 periodically recurring, 80-millisecond (ms) slots. In order to help conserve AT battery power, an AT in the idle state monitors only certain assigned slots on a given paging channel. More specifically, an AT's assigned slots recur according to a "slot cycle" having a sub-period within the 2,048-slot "maximum slot cycle" period (163.84 seconds). The sub-period (slot cycle) is set according to a system parameter called the "slot cycle index." For instance, slot cycle index values of 0, 1, and 2 define slot cycles of 1.28, 2.56, and 5.12 seconds, respectively, corresponding to recurrence every 16, 32, and 64 slots per maximum slot cycle. Within the maximum slot cycle, the phase of an AT's slots is determined according to a "hashing function" that effectively randomizes the phases of all ATs such that, on average, no one slot is assigned to more ATs than any other slot. Access terminals that hash to the same slot (i.e., that listen for pages on the same slot) are said to belong to the same "slot group."

During each of an AT's slots, it will scan the 1X paging channel for any possible messages (pages). The duration of the scan is typically 80-120 ms, although longer scans are possible depending on whether a message has been sent, the length of the message, and the RF conditions on the AT's forward link, among other factors.

b. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, the BTS of a serving sector transmits to all its active ATs on a common forward link, using time division multiplexing (TDM) to distinguish transmissions among the recipient ATs. Each transmission is made at the full power of the sector, thereby optimizing the achievable signal-to-noise characteristics. As a result of the full-power allocation by the sector, an access terminal operating under IS-856 can, in theory, receive packet-data at a rate of at least 38.4 kbps and up to 2.4 Mbps on its forward link. The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors as a basis to facilitate active set management, i.e., to facilitate handoff from one sector to another.

Operation in an IS-856 compliant communication system may be illustrated, again with reference to FIG. 2. To acquire an EVDO packet data connection, after an access terminal first detects an IS-856 carrier, the access terminal sends to its BSC (or RNC) 206 a UATI (Universal Access Terminal Identifier) request, and receives in response an UATI, which the access terminal can then use to identify itself in subsequent communications with the BSC. The access terminal then sends a connection-request to the BSC 206, and the BSC responsively invokes a process to authenticate the access terminal and to have the access terminal acquire a data link.

In particular, the BSC 206 sends an access request to an Access Network AAA (ANAAA) server (which may be different than the AAA server 220), and the ANAAA server authenticates the access terminal. The BSC 206 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 216 (via PCF 214), and the PDSN and access terminal then negotiate to establish a PPP data link. In addition, as in the IS-2000 process, the access terminal then sends an MIP RRQ to the PDSN, which the PDSN forwards to the HA 222, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal to noise ratio, thus facilitating higher rate data communication than the power-limited CDMA channels. Upon termination of the AT's EVDO session, the AT returns to an idle or dormant mode of operation.

2. BACKOFF AND PERSISTENCE DELAY BASED ON RECEPTION OF A CONCATENATED PAGE MESSAGE a. General Operating Principles Under both IS-2000 and IS-856, an access terminal responds to a page message from the RAN by transmitting one or more access attempt messages to a sector (or other form of coverage area), as described above. More specifically, each sector supports one or more access channels on its reverse link for receiving access attempt messages from ATs operating in the sector. Up to 32 access channels can be configured for each of up to seven forward-channel page channels in a sector (although fewer than the 32 access channels per page channel are actually deployed in typical system configurations). Each access channel in a sector is configured for transmission during access channel slots, and each is shared on a random-access basis among the ATs in sector. When an AT receives a page message from the RAN, the AT responds by transmitting one or more access attempt messages, each during one access channel slot of one of the available access channels to a serving sector. As such, the AT is prompted to transmit an access attempt message in response to receiving a page message. An access attempt message transmitted in response to a page is therefore also referred to as an access response message (or more specifically a "page response" message).

An AT may also transmit an unsolicited access attempt message on an access channel to its serving sector. For instance, when originating a call, an AT will transmit one or more access attempt messages seeking access from its serving sector. If successful, the RAN will assign a traffic channel to the AT via its serving sector. An unsolicited access attempt message requesting access is therefore also referred to as an access request message.

Both access response messages and access request messages are transmitted by the AT in message units referred to access probes. An access probe comprises an identification of the access terminal seeking access, as well information specific to the nature of the access attempt, such as the type of call or session being sought, among other possible details. Each access probe is transmitted during one access channel slot of a particular access channel. The transmission is spread or modulated using a PN long code mask that identities the particular access channel. Each access channel slot is a fixed number of 20-millisecond access channel frames, which also sets the size of each access probe. The fixed number is set by the system, typically in a range of 4-26 frames, and is communicated to the AT in an Access Parameters Message. In practice, the AT may also apply a delay of several chips after the start of a given access slot before commencing transmission of an access probe.

For a given access attempt, the AT will transmit one or more sequences of access probes on an access channel of the serving sector, each sequence comprising up to a system-configurable, maximum number of access probe transmissions, and each probe transmission occupying one access channel slot. The actual number of probes transmitted in a given sequence as well as the actual number of sequences transmitted depends on if and when the sector responds. Each successive access probe is transmitted at a higher power than the preceding one. Between each probe of a sequence, the AT waits a fixed time TA for a response from the RAN. If no response is received, the AT delays an additional random time RT and then transmits the next probe of the sequence. Once the RAN acknowledges an access probe, the AT ceases further probe transmissions and waits for assignment of a traffic channel from the RAN.

If no response is received for any probes of a given sequence, and if the AT has not already transmitted a maximum allowed number of probe sequences (wherein the maximum allowed number is also a system parameter), the AT delays an additional amount of time and then commences transmission of another sequence of access probes. Under conventional operation, the delay between sequences of access probes (and prior to the initial probe of a first sequence) depends on whether the access attempt is an access response or an access request. For both an access response and an access request, the delay between probe sequences includes a random backoff delay, designated "RS," computed as a random number of access channel slots and selected in a range from a minimum number to a maximum number of slots. For an access request, the delay between probe sequences includes an additional persistence delay, PD, which is computed in units of access channel slots as described above in connection with FIG. 1. Prior to the initial probe of the first sequence of probes of an access request, the AT conventionally applies only the persistence delay.

The AT continues to transmit access probes until either the RAN responds or the total number of allowed probes has been reached with no response from the RAN, whichever occurs first. The total number of access probes transmitted in either case (i.e., probes per sequence and number of sequences) comprises an access attempt. In the case of a failed access attempt in a given sector (i.e., no response), the AT may attempt to seek access from an alternate sector (or coverage area element).

b. Delay Parameters for Responding to a Concatenated Page Message

Because each access channel is shared among possibly multiple access terminals, it is possible for transmission collisions to arise if two or more access terminals attempt to transmit access probes during the same access channel slot. The random delays between probes of a sequence and between sequences help to mitigate collisions. Additionally, since the RAN can control when it sends pages messages, it can to some extent control the timing of response attempts from access terminals. However, sending pages to individual access terminals in separate page transmissions may not be the most efficient use of the paging channel.

Hence, rather than sending separate page messages to each access terminal, the RAN may broadcast a "General Page Message" ("GPM") to multiple access terminals in a particular slot group. The GPM includes one or more individual page messages or records, typically up to eight. Each page record identifies a particular access terminal according to a terminal identifier and contains a page message for that particular access terminal. The possibly multiple page records in a GPM comprise a concatenation of page messages, so a GPM containing a concatenation of page messages is also sometimes referred to as a concatenated page message. To receive a page message in a concatenated page message, the access terminal (i) wakes up during its time slot, (ii) receives the GPM, and (iii) searches the GPM for a page record with a terminal identifier that matches the access terminal's terminal ID.

While a concatenated page message can make more efficient use of a paging channel, the near simultaneous reception of the message by up to eight access terminals can lead to an increased probability of access probe collisions, since all the receiving access terminals are prompted to respond at nearly the same time. Accordingly, in an example embodiment of the present invention an AT will advantageously adapt its timing of access response messages when it determines that a particular page message has been received as part of a concatenated page message.

Figure 3:
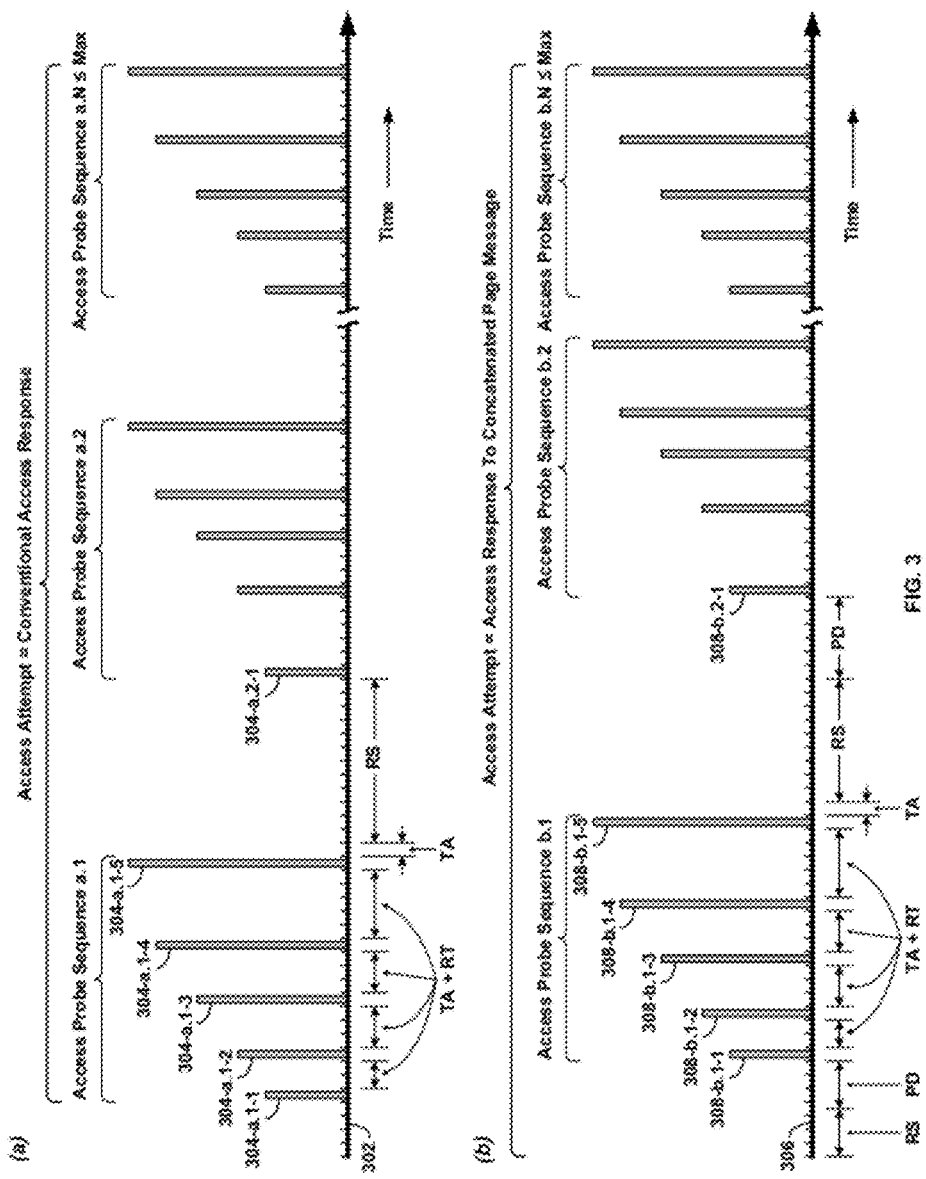
FIG. 3 illustrates example sequences of access probes transmitted by an access terminal both for a conventional access response, and for a response to a concatenated page message according to an example embodiment of variable persistence delay.

Operation of the example embodiment is illustrated in FIG. 3, which depicts access probe transmissions as a function of time for a conventional access response (top panel "(a)" in the figure) and for an access response to a concatenated page message according to the example embodiment (bottom panel "(b)" in the figure). Each access probe is represented by a vertical bar, wherein the height of the bar represents the transmission power (in arbitrary units for the purposes of this illustration). By way of example, each panel in FIG. 3 shows three sequences of access probes arranged along a timeline, and each sequence includes five access probes. Each successive access probe in a given sequence is transmitted at a higher power than the preceding probe of the same sequence. The consecutive tick marks along the timelines (timeline 302 in the top panel; timeline 306 in the bottom panel) represent consecutive access channel slots. As shown, each probe is transmitted during one access channel slot.

In top panel (a), the access attempt includes access probe sequences "a.1," "a.2," and "a.N." As indicated, a.N is no larger than "Max," which corresponds to a system-specified limit to the maximum number of sequences for any given access attempt. The hatch marks interrupting timeline 302 indicate that there could be one or more additional sequences between a.2 and a.N. Sequence a.1 includes five probes labeled 304-a.1-1, 304-a.1-2, 304-a.1-3, 304-a.1-4, and 304-a.1-5, depicted in increasing time order (and power). Sequence a.2 includes the next five probes, but only the initial probe (304-a.2-1) is labeled. For the sake of brevity, labels are omitted from the remaining probes of sequences a.2 and a.N.

Under conventional operation, there is a delay of TA+RT between the probes of sequence a.1. As described above TA is a fixed delay and RT is a random delay. Between the last probe of a.1 (304-a.1-5) and the first probe of a.2 (304-a.2-1), there is first the delay TA, during which the AT waits for a response from the RAN, followed by the random backoff delay RS. Although not explicitly labeled, similar delays apply to the remaining probes and probe sequences.

The access attempt shown in bottom panel (b) is an access response to a concatenated page message, in accordance with the example embodiment. This access attempt includes access probe sequences "b.1," "b.2," and "b.N." As indicated, b.N is also no larger than "Max." As with the top panel, the hatch marks interrupting timeline 306 indicate that there could be one or more additional sequences between b.2 and b.N. Sequence b.1 includes five probes labeled 308-b.1-1, 308-b.1-2, 308-b.1-3, 308-b.1-4, and 308-b.1-5, depicted in increasing time order (and power). Sequence b.2 includes the next five probes, but only the initial probe (308-b.2-1) is labeled. Again, labels are omitted from the remaining probes of sequences b.2 and b.N for the sake of brevity.

As with conventional operation, there is a delay of TA+RT between the probes of sequence b.1, and similarly (although no explicitly labeled) between the probes of sequence b.2 and between the probes of sequence b.N. However, unlike a conventional access response, between the last probe (308-b.1-5) of b.1 and the first probe (308-b.2-1) of b.2, in addition to the delay TA and the subsequent random backoff delay RS, there is also a persistence delay PD. Moreover, there is also a delay of RS+PD preceding the initial probe (308-b.1-1) of the first sequence (b.1). Thus, even though the access attempt is responsive to a page message, the receiving AT implements a persistence delay because the page message is part of a concatenated page message.

In practice, the delays are computed and applied by the AT prior to each access probe transmission. In further accordance with the example embodiment, the access terminal selects parameters used to calculate RS and PD based a determination made by the AT that the received page message is a concatenated page message. In this sense, the AT thus computes a backoff delay according to a backoff algorithm that is based on the determination. Similarly, the AT computes a persistence delay according to a persistence algorithm that is also based on the determination.

More particularly, the page records in concatenated page message comprise an ordered list of page messages, from a first to a last message. In accordance with the example embodiment, the AT will select delay parameters based on the place-order of its received page message in the ordered list. Specifically, the AT will maintain in its memory a data structure (such as a table) of delay parameters arranged such that the place-order of the received page message determines which parameters are selected. By configuring all access terminals in a common slot group to use the same table of parameters, each access terminal that receives the same concatenated page message may be respectively biased to apply a different set of delays when responding. Advantageously, the likelihood of access probe collisions may be reduced.

Figure 4:
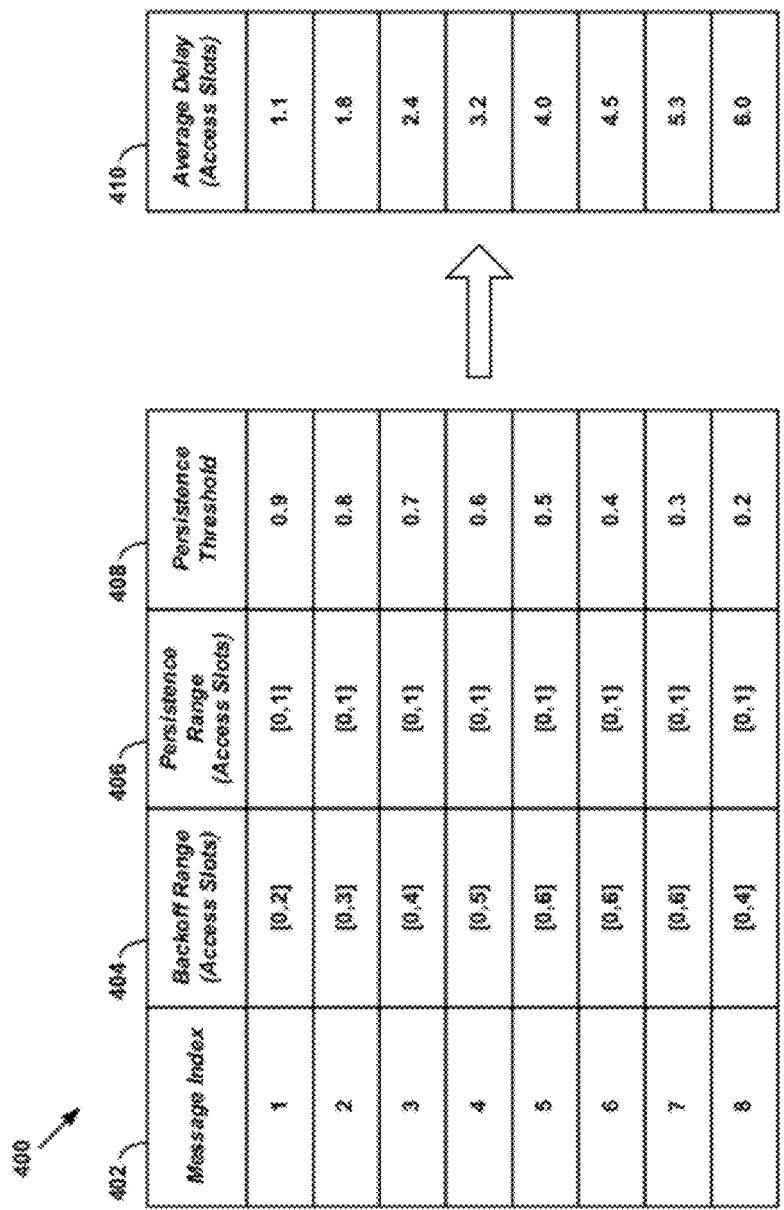
FIG. 4 illustrates an example table of access channel delay parameters for use by an access terminal in an example embodiment of variable persistence delay.

FIG. 4 illustrates an example of a table 400 of delay parameters that an access terminal may maintain in its memory to cause the AT to bias its access probe transmission delays differently from other access terminals, when responding to a concatenated page message. As shown by way of example, table 400 includes columns 402, 404, 406, and 408 labeled "Message Index," "Backoff Range," "Persistence Range," and "Persistence Threshold," respectively. As noted, the Backoff Range and Persistence Range are in units of access channel slots. The numbers (1-8) in the Message Index column correspond to the place-order of a page message received by the AT in any given concatenated page message. The values in the other columns correspond to the delay parameters described in the respective column heading. Each row in the table 400 corresponds to a table entry, and each entry provides a selection of delay parameters according to the index value.

In accordance with the example embodiment, there are eight table entries, corresponding to up to eight page records in a single concatenated page message. It should be understood that a concatenated page message could accommodate a larger or smaller maximum number of page records, and that a table such as table 400 could correspondingly include more or fewer entries. It will also be appreciated that any given concatenated page message could include fewer page records than the maximum allowed number. An AT will compute the delays RS and PD for an access response to any given concatenated page message according to the delay parameters of a given table entry.

As described in connection with FIG. 1, the expected (average) value of the backoff delay is midway in the backoff range. Referring to the table 400 in FIG. 4, the average backoff delay for the first table entry, for example, is midway in the range [0,2], or equal to 1.0. Similarly, the average delay for the second table entry is 1.5; the average delay for the third table entry is 2.0; and so on. Also as explained in connection with FIG. 1, the expected (average) persistence delay for a persistence threshold $P_{thresh}$ in a range of [0,1] is given (in units of access channel slots) by $(1-P_{thresh})/P_{thresh}$. Since RS and PD are computed independently, the expected (average) total delay is sum of their averages. For the example delay parameters in table 400, the average total delays are shown in column 410. As indicated, the average values are spread out roughly uniformly between a minimum of 1.1 slots and maximum of 6.0 slots. It will be appreciated that other values of the parameters in table 400 could yield different average total delays.

In further accordance with the example embodiment, multiple access terminals would be configured to store the same table 400 of delay parameters. For example most or all access terminals registered in a given wireless communication system could receive the table in an Access Parameters Message, and each of the access terminals could store the received table in its memory. The RAN would also maintain a copy of the table (or tables) in one or more data storage elements (e.g., a distributed database). Upon receiving a given concatenated page message, an AT would determine the place-order of the particular page directed to the AT and would select the table record associated with the determined place-order.

For example, if an AT that receives a concatenated page message and determines that the third page is directed to the AT, the AT will use the delay parameters of the third table entry to compute RS and PD. Specifically, the AT will use the backoff range [0,4] to calculate RS and the persistence range [0,1] and persistence threshold 0.7 to compute PD. Similarly, another access terminal that receives the same concatenated page message might be the designated recipient of the sixth page record, and will therefore select the delay parameters of the sixth table entry, and so on. Advantageously, each recipient access terminal of a given concatenated page message will on average compute a different total delay RS+PD preceding its first sequence of access probes and between its successive sequences of access probes.

The table of delay parameters, such as table 400, could be provided to an access terminal by the RAN in an Access Parameters Message, or other similar system message. Upon receiving the table (or other form of data structure), the AT could store the table in its memory, and consult the table when computing delays for an access response to any given concatenated page message. In further accordance to the example embodiment, the RAN could provide different tables (with different parameter values) to different groups of access terminals, so as to cause different delays to be applied on average by the different groups.

In the example embodiment, backoff delays calculated using different values of delay parameters may be considered as being calculated using to different backoff algorithms, and similarly for persistence delay calculations. However, the algorithms could themselves be based on the determination that a particular page message is part of a concatenated page message. That is, differences between algorithms are not necessarily limited to differences between parameter values used in one or another algorithm.

As still a further aspect of the example embodiment, the RAN could arrange the order of page records in a particular concatenated page message so as to bias the order in which the recipient access terminals respond. More particularly, as described above, the delay parameters in table 400 yield increasing average total delay with increasing index number. Hence, the RAN could ensure that an access terminal receiving the first page record of a given concatenated page message would on average apply a shorter delay when responding than any of the other access terminals receiving the same concatenated page message. This would allow the RAN to impose some degree of control of the timing of access response message without explicitly directing the access terminals to use one or another set of delay parameter values. It will be appreciated that different parameter values than those illustrated by way of example in table 400 could be used, and that the RAN could correspondingly arrange the order of page records in concatenated pages to achieve a degree of implicit control over the average timing of access responses to concatenated page messages.

Finally, as noted, a sector (or other form of coverage area) can support multiple access channels per paging channel. Under conventional operation, when multiple access channels are deployed for a given paging channel, an AT responding to page received on the given paging channel will randomly select one of the associated access channels. In practice, only one or a few of the maximum number or access channels per paging channel are actually deployed. This may be due to the cost of additional hardware for deploying multiple access channels, the added overhead for supporting additional RF resources, or other factors. However, as the number of deployed access channels goes down, the likelihood of access probe collisions goes up. In further accordance with the example embodiment, a balance may be achieved between the overhead associated with multiple active access channels and collision avoidance.

More particularly, a wireless communication system will deploy multiple access channels associated with each of one or more paging channels in one or more sectors (or other form of coverage area), but will only activate more than one access channel per any one paging channel on an as-needed basis. Further, an AT receiving a concatenated page message on given paging channel will determine from the number of included page records how many of the access channels associated with the given paging channel are activated and available. If more than one is activated, the AT will choose among them according to the conventional selection method; i.e., the AT will choose an access channel at random.

In accordance with the example embodiment, the RAN will provide the AT with an additional table (not shown) that associates the number of page records in any given concatenated page message with a number of active access channels. For example, the table might associate 1-2 page records with one active access channel, 3-5 with two active access channels, and 5-8 with three active access channels. The RAN will maintain this table, and also provide it to the AT (e.g., in an Access Parameters Message). The AT could store the table in its memory (in addition to storing table 400 or the like). Upon transmitting a concatenated page message, the sector would activate a number of access channels according the number of included page records, as specified in the table. Upon receiving the concatenated page message, in addition to selecting delay parameters as described above, the AT would also determine the how many active access channels are available for responding based on the number of include page records (and by consulting the table). If more than one is available, the AT will choose one at random. Advantageously, the RAN would activate multiple access channels only when needed, and each access terminal would be able to determine how many are active for any given access response to a concatenated page message.

3. EXAMPLE EMBODIMENT OF VARIABLE PERSISTENCE DELAY IN AN ACCESS TERMINAL

The example embodiment described above in connection with FIGS. 3 and 4 can be implemented as a method carried out on an access terminal or other communication device that operates according to IS-2000 and/or IS-856 in a similarly-compliant wireless communication system such as the one described above in connection with FIG. 2. The logical steps and operations of the method are described in the next subsection. Example means for carrying out the method are described in the subsequent subsection.

a. Example Method Implementation

Figure 5:
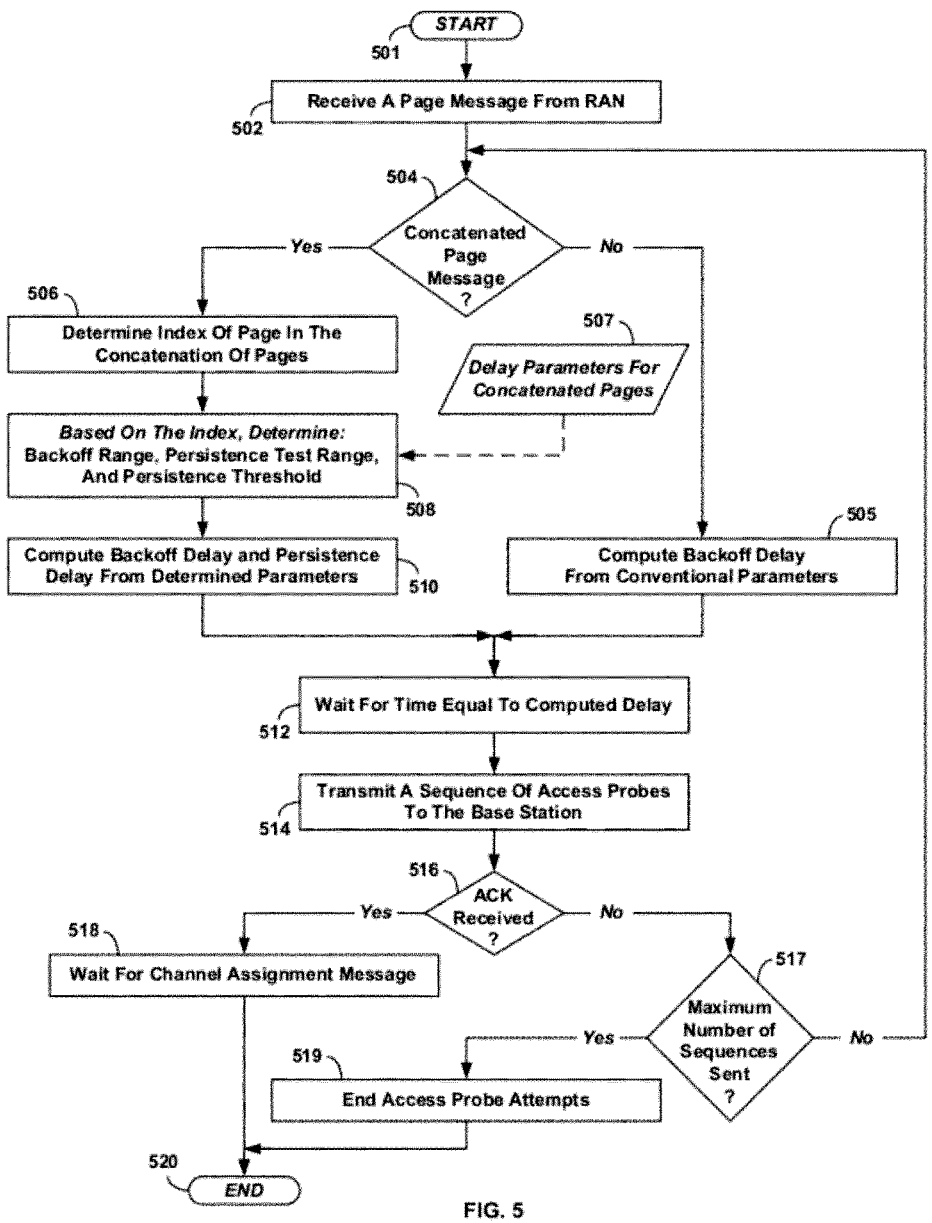
FIG. 5 is a flowchart depicting an example implementation of logical operational steps for carrying out variable persistence delay for an access terminal receiving a concatenated page.

An implementation of the example embodiment illustrated in the form of a logical flowchart is shown in FIG. 5. As such, the illustrated steps could be implemented in the form of computer software (or other form of machine-language instructions) stored in one or more forms of computer readable memory and/or media in an access terminal (or similar device) operating in a system such as that illustrated in FIG. 2, and executed by one or more processors of the access terminal.

At the start 501 of the process the AT may be in an idle state, and therefore checks for page messages during its slot cycle, as described above. By way of example, the AT receives a page message (at step 502) from the RAN.

At step 504 the AT determines if the received page message is a part of concatenated page message. In practice, the AT will have retrieved a page record from a concatenation of page records if the page message is a concatenated page message. Thus, the determination will be made as part of the process of retrieving the page record. If the page message is part of a concatenated page message ("Yes" branch from step 504), then the AT determines (step 506) the index of the page record within the concatenated page message. This corresponds to determining the place-order, as described above.

The AT then uses the index to determine values for delay parameters to use in computing delays. Specifically, the AT maintains a table (such as table 400) in data storage 507. At step 508, the AT uses the index to look up values of the backoff range, persistence test range, and persistence threshold. The dashed arrow from data storage 507 to block 508 represents retrieval of the parameter values.

At step 510, using the parameter values selected at step 508, the AT computes a backoff delay according to a random selection in the backoff range and computes a persistence delay in the manner described above in connection with FIG. 1. At step 512, the AT waits for a time equal to the sum of the backoff delay and the persistence delay. In practice, the persistence delay is incurred at the same time that it is calculated. However, for the purposes of the present illustration, computation is indicated as a separate step (510).

After waiting the computed delay, the AT begins to transmit a sequence of access probes at step 514. At step 516 the AT determines whether or not an acknowledgement has been received to the any transmitted access probe of the sequence. In practice, each sequence will comprise one or more access probe transmissions with the delays TA and RA between each, as described above. For the sake of brevity in the figure, however, a separate step for each individual access probe transmissions is not shown.

If an acknowledgement has been received ("Yes" branch from step 516), the AT then waits (step 518) for a channel assignment message (or and enhanced channel assignment message) from the serving sector. In this case, the AT will acquire a traffic channel and can proceed with a call or other form of communication session according to known protocols and methods of IS-2000 and/or IS-856 (or other CDMA-related protocol). The process then ends at step 520.

If no acknowledgement is received ("No" branch from step 516), the AT then determines at step 517 if it has already sent a maximum number of access probe sequences. In view of the omission from this illustration of steps showing individual access probe transmissions, the absence of an acknowledgement implies that no acknowledgment was received for any of the individual access probes of the sequence. Hence, the "No" branch from step 516 implies that the maximum number of access probes for a sequence was transmitted, but no acknowledgement was received for any of them.

If the maximum number of access probe sequences has not been transmitted ("No" branch from step 517), then the process returns to step 504, and a new sequence of access probes may be transmitted according to steps 504-514. If the maximum number of access probe sequences has been transmitted ("Yes" branch from step 517), then the AT (at step 519) ends its attempt to acquire access from the serving base station (or sector). This represents a failed access attempt, in which case the AT may seek access from a different sector. The process then ends at step 520.

If the AT determines at step 504 that the page message is not part of a concatenated page message ("No" branch from step 504), then the AT computes a backoff delay and a persistence delay according to conventional delay parameters at step 505. The process then proceeds as described above beginning from step 512. That is, the "No" branch from step 504 leads to conventional operation with respect to backoff and persistence delays It will be appreciated that the steps of FIG. 5 are illustrated by way of example, and that additional and/or alternative steps or alternative ordering of steps could be carried in order to achieve variable persistence delay for an access terminal receiving a concatenated page.

b. Example Access Terminal

Figure 6:
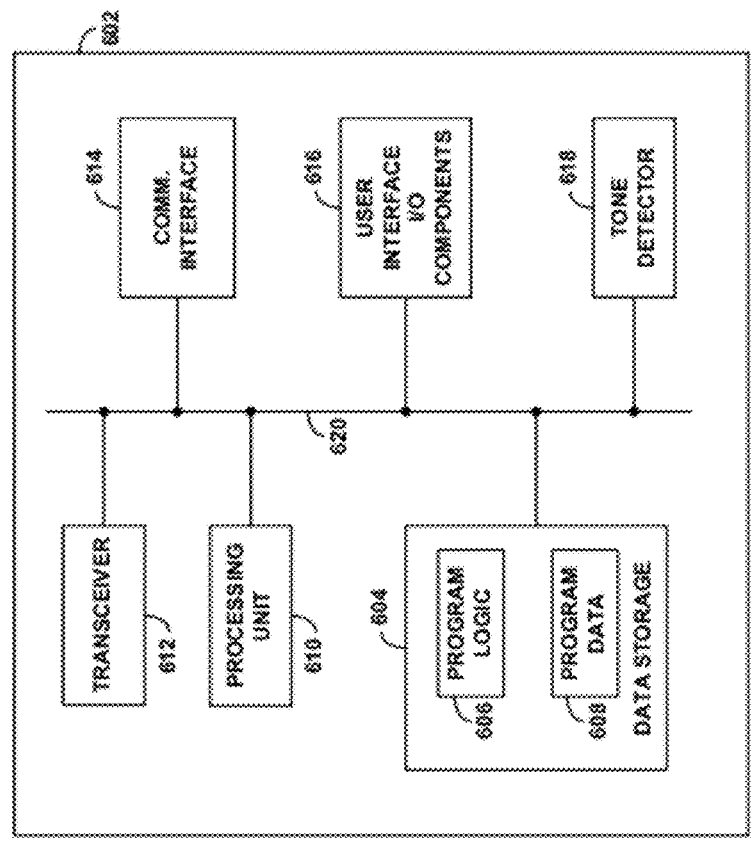
FIG. 6 shows an example access terminal in which variable persistence delay for an access terminal receiving a concatenated page could be implemented.

FIG. 6 is a simplified block diagram depicting functional components of an example access terminal 602 in which a method variable persistence delay for an access terminal receiving a concatenated page may be implemented. The example AT 602 could be a cell phone, a personal digital assistant (PDA), a pager, a wired or wirelessly-equipped notebook computer, or any other sort of device. As shown in FIG. 6, the example AT 602 includes data storage 604, processing unit 610, transceiver 612, communication interface 614, user-interface I/O components 616, and tone detector 618, all of which may be coupled together by a system bus 620 or other mechanism.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of AT 602 relevant to variable persistence delay for an access terminal receiving a concatenated page are discussed briefly below.

Communication interface 614 in combination with transceiver 612, which may include one or more antennas, supports forward and reverse link channels for communications with the network, including transmission of access probes, and reception of page messages (including concatenated page messages) and various system messages discussed above (including Access Parameters Messages). The communication interface may include a module, such as an MSM™-series chipset made by Qualcomm Inc. of San Diego, Calif., and supports wireless packet-data communications according to a CDMA family of protocols.

Processing unit 610 comprises one or more general-purpose processors (e.g., INTEL microprocessors) and/or one or more special-purpose processors (e.g., dedicated digital signal processor, application specific integrated circuit, etc.). In turn, the data storage 604 comprises one or more volatile and/or non-volatile storage components, such as magnetic or optical memory or disk storage. Data storage 604 can be integrated in whole or in part with processing unit 610, as cache memory or registers for instance. In example AT 602, as shown, data storage 604 is configured to hold both program logic 606 and program data 608.

Program logic 606 may comprise machine language instructions that define routines executable by processing unit 610 to carry out various functions described herein. In particular the program logic, communication interface, and transceiver may operate cooperatively to carry out logical operation such as that discussed above and illustrated in FIG. 5. Program data 608 could also comprise storage, such as data storage 507, for a table of delay parameters (such as table 400) and/or a table associating a number of page records with a number of active access channels also discussed above.

It will be appreciated that there can be numerous specific implementations in an access terminal such as AT 602 of variable persistence delay. Further, one of skill in the art would understand how to devise and build such an implementation. As such, AT 602 is representative of means for carrying out the method of variable persistence delay for an access terminal receiving a concatenated page in accordance with the methods and steps described herein by way of example.

4. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In an access terminal configured to operate in a wireless communication system that includes a base station, a method comprising:

at the access terminal, receiving a particular response-expected message from the base station, wherein a response-expected message is a message to which any given access terminal responds by transmitting an access attempt message, an access attempt message being a request by the any given access terminal for wireless access;

at the access terminal, making a determination that the particular response-expected message is one of a plurality of response-expected messages in a single, compound message transmitted to a corresponding plurality of access terminals, the access terminal being one of the plurality of access terminals;

at the access terminal, responsive to the determination: selecting a maximum delay, randomly selecting a first backoff delay between a minimum delay and the maximum delay, and selecting a particular threshold number between a minimum number and a maximum number;

at the access terminal, after waiting for a time equal to at least the first backoff delay, repeatedly making a random selection of a number between the minimum number and the maximum number until an occurrence of a random selection that yields a value smaller than the particular threshold number, while also waiting for a time equal to a test delay between making each repeated, random selection; and at the access terminal, transmitting a particular access attempt message on an air interface communication link to the base station after the occurrence.

2. The method of claim 1, wherein the access terminal is further configured to operate according to a CDMA family of protocols, wherein each of the plurality of response-expected messages is a page message directed to a different one of the plurality of access terminals, the particular response-expected message being a particular page message directed to the access terminal, and the plurality of response-expected messages being a plurality of page messages, wherein the compound message is a concatenated page message comprising a concatenation of the plurality of page messages including the particular page message, and wherein receiving the particular response-expected message from the base station comprises:

receiving the concatenated page message from the base station; and retrieving the particular page message from the concatenated page message.

3. The method of claim 2, wherein making the determination comprises determining that the particular page message is one page message of a concatenated page message.

4. The method of claim 2, wherein the concatenation of the plurality of page messages is arranged in an order from a first page message to a last page message, and the particular page message occupies a particular place in the order, wherein selecting the maximum delay comprises selecting the maximum delay based on the particular place in the order, and wherein selecting the particular threshold number comprises selecting the particular threshold number based on the particular place in the order.

5. The method of claim 1, wherein the access terminal is further configured to operate according to a CDMA family of protocols, wherein any given access attempt message is an access probe, wherein the particular access attempt message is a particular access probe for responding to the received particular response-expected message, wherein the air interface communication link to the base station comprises an access channel for transmissions from the access terminal to the base station, wherein the access channel is configured for transmissions during successive access channel slots, and wherein transmitting the particular access attempt message on an air interface communication link to the base station comprises transmitting the particular access probe on the access channel during one access channel slot.

6. The method of claim 5, wherein the minimum delay is a minimum integer number of access channel slots, the minimum integer being zero or greater, wherein selecting the maximum delay comprises selecting a maximum integer number of access channel slots, the maximum integer being larger than the minimum integer, and wherein randomly selecting the first backoff delay between the minimum delay and the maximum delay comprises randomly selecting a first backoff integer number of access channel slots, the first backoff integer being in an inclusive range between the minimum integer and the maximum integer.

7. The method of claim 6, wherein the plurality of response-expected messages in the single, compound message is arranged in an order from a first response-expected message to a last response-expected message, and the particular response-expected message occupies a particular place in the order, wherein selecting the maximum integer number of access channel slots comprises selecting the maximum integer number of access channel slots based on the particular place in the order, and wherein selecting the particular threshold number comprises selecting the particular threshold number based on the particular place in the order.

8. The method of claim 5, wherein the test delay is equal to one access channel slot.

9. The method of claim 5, wherein the particular access probe is an initial access probe in a first sequence of access probes each transmitted by the access terminal in response to the received particular response-expected message, the first sequence of access probes being ordered from the initial access probe to a final access probe, wherein transmitting the particular access probe comprises transmitting the initial access probe, and wherein the method further comprises:

randomly selecting a second backoff delay between the minimum delay and the maximum delay;

after transmitting the final access probe of the first sequence of access probes and thereafter waiting for a time equal to at least the second backoff delay:

repeatedly making a random selection of a number between the minimum number and the maximum number until a new occurrence of a random selection that yields a value smaller than the particular threshold number, while also waiting for a time equal to one access channel slot between making each repeated, random selection; and after the new occurrence, transmitting an access probe in response to the received particular response-expected message.

10. The method of claim 1, wherein the air interface communication link to the base station comprises an available number of access channels for transmissions from the access terminal to the base station, wherein making the determination that the particular response-expected message is one of a plurality of response-expected messages in the single, compound message comprises determining how many total response-expected messages are in the plurality of response-expected messages, and wherein transmitting the particular access attempt message on an air interface communication link to the base station comprises:

determining the available number of access channels based on how many total response-expected messages are in the plurality of response-expected messages;

selecting one access channel from among the available number of access channels; and transmitting the particular access attempt message on the selected access channel.

11. In an access terminal configured to operate in a wireless communication system that includes a base station, a method comprising:
- at the access terminal, receiving a particular response-expected message in a compound message from the base station, the compound message comprising a plurality of response-expected messages including the particular response-expected message, each directed to a different one of a plurality of access terminals including the access terminal, and each requiring the different one of the plurality of access terminals to transmit a respective access attempt message to the base station;
- at the access terminal, responsive to making a determination that the particular response-expected message was received in the compound message, computing a first backoff delay according to a backoff algorithm that is based on the determination, and computing a first persistence delay according to a persistence algorithm that is based on the determination; and
- at the access terminal, after waiting a time equal to at least the sum of the first backoff delay and the first persistence delay, transmitting a particular access attempt message on an air interface communication link to the base station.

12. The method of claim 11, wherein the access terminal is further configured to operate according to a CDMA family of protocols,
- wherein each of the plurality of response-expected messages is a page message, the particular response-expected message being a particular page message directed to the access terminal, and the plurality of response-expected messages being a plurality of page messages,
- wherein the compound message is a concatenated page message comprising a concatenation of the plurality of page messages including the particular page message,
- and wherein making the determination comprises determining that the particular page message is one page message of a concatenated page message.

13. The method of claim 11, wherein the plurality of response-expected messages is arranged in the compound message in an order from a first response-expected message to a last response-expected message, and the particular response-expected message occupies a particular place in the order,
- wherein computing the first backoff delay according to a backoff algorithm that is based on the determination comprises computing the first backoff delay according to a backoff algorithm that is based on the particular place in the order,
- and wherein computing the first persistence delay according to a persistence algorithm that is based on the determination comprises computing the first persistence delay according to a persistence algorithm that is based on the particular place in the order.

14. The method of claim 11, wherein computing the first backoff delay according to a backoff algorithm that is based on the determination comprises: selecting a backoff range based on the determination, and setting the first backoff delay to a delay value randomly selected in the backoff range,
- and wherein computing the first persistence delay according to a persistence algorithm that is based on the determination comprises: selecting both a particular range and particular threshold number in the particular range based on the determination, and after waiting for a time equal to at least the first backoff delay, repeatedly making a random selection of a number in the particular range until an occurrence of a random selection that yields a value smaller than the particular threshold number, while also waiting for a time equal to a test delay between making each repeated, random selection.

15. The method of claim 14, wherein the access terminal is further configured to operate according to a CDMA family of protocols,
- wherein any given access attempt message is an access probe,
- wherein the particular access attempt message is a particular access probe for responding to the received particular response-expected message,
- wherein the air interface communication link to the base station comprises an access channel for transmissions from the access terminal to the base station,
- wherein the access channel is configured for transmissions during successive access channel slots,
- and wherein transmitting the particular access attempt message on an air interface communication link to the base station comprises transmitting the particular access probe on the access channel during one access channel slot.

16. The method of claim 15, wherein the plurality of response-expected messages is arranged in the compound message in an order from a first response-expected message to a last response-expected message, and the particular response-expected message occupies a particular place in the order,
- wherein the first backoff delay is computed in terms of an integer number of access channel slots, and the test delay is equal to one access channel slot,
- wherein selecting the backoff range based on the determination comprises setting the backoff range to an integer range between a minimum integer number and a maximum integer number, both the minimum integer number and the maximum integer number being selected based on the particular place in the order,
- and wherein selecting both the particular range and particular threshold number in the particular range based on the determination comprises selecting both the particular range and particular threshold number in the particular range based on the particular place in the order.

17. The method of claim 15, wherein the particular access probe is an initial access probe in a first sequence of access probes each transmitted by the access terminal in response to the received particular response-expected message, the first sequence of access probes being ordered from the initial access probe to a final access probe,
- wherein transmitting the particular access probe comprises transmitting the initial access probe,
- and wherein the method further comprises, after transmitting the final access probe of the first sequence of access probes:
- computing a second backoff delay according to the backoff algorithm that is based on the determination, and computing a second persistence delay according to the persistence algorithm that is based on the determination; and
- at the access terminal, after waiting a time equal to at least the sum of the second backoff delay and the second persistence delay, transmitting an access probe in response to the received particular response-expected message.

18. The method of claim 11, wherein the air interface communication link to the base station comprises an available number of access channels for transmissions from the access terminal to the base station, wherein making the determination that the particular response-expected message was received in the compound message comprises determining how many total response-expected messages are in the plurality of response-expected messages, and wherein transmitting the particular access attempt message on an air interface communication link to the base station comprises:

determining the available number of access channels based on how many total response-expected messages are in the plurality of response-expected messages;

selecting one access channel from among the available number of access channels; and transmitting the particular access attempt message on the selected access channel.

19. An access terminal configured to operate in a wireless communication system that includes a base station, the access terminal comprising:

means for receiving a particular response-expected message in a compound message from the base station, wherein the compound message comprises a plurality of response-expected messages including the particular response-expected message, each directed to a different one of a plurality of access terminals including the access terminal, and each requiring the different one of the plurality of access terminals to transmit a respective access attempt message to the base station;

means for making a determination that the particular response-expected message was received in the compound message, and responsive to the determination: computing a first backoff delay according to a backoff algorithm that is based on the determination, and computing a first persistence delay according to a persistence algorithm that is based on the determination; and means for waiting a first total delay time equal to at least the sum of the first backoff delay and the first persistence delay, and after waiting the first total delay time, transmitting a particular access attempt message on an air interface communication link to the base station.

20. The access terminal of claim 19, wherein the access terminal is further configured to operate according to a CDMA family of protocols, wherein each of the plurality of response-expected messages is a page message, the particular response-expected message being a particular page message directed to the access terminal, and the plurality of response-expected messages being a plurality of page messages, wherein the compound message is a concatenated page message comprising a concatenation of the plurality of page messages including the particular page message, and wherein making the determination comprises determining that the particular page message is one page message of a concatenated page message.

21. The access terminal of claim 19, wherein the plurality of response-expected messages is arranged in the compound message in an order from a first response-expected message to a last response-expected message, and wherein the particular response-expected message occupies a particular place in the order, wherein computing the first backoff delay according to a backoff algorithm that is based on the determination comprises computing the first backoff delay according to a backoff algorithm that is based on the particular place in the order, and wherein computing the first persistence delay according to a persistence algorithm that is based on the determination comprises computing the first persistence delay according to a persistence algorithm that is based on the particular place in the order.

22. The access terminal of claim 19, wherein computing the first backoff delay according to a backoff algorithm that is based on the determination comprises: selecting a backoff range based on the determination, and setting the first backoff delay to a delay value randomly selected in the backoff range, and wherein computing the first persistence delay according to a persistence algorithm that is based on the determination comprises: selecting both a particular range and particular threshold number in the particular range based on the determination, and after waiting for a time equal to at least the first backoff delay, repeatedly making a random selection of a number in the particular range until an occurrence of a random selection that yields a value smaller than the particular threshold number, while also waiting for a time equal to a test delay between making each repeated, random selection.

23. The access terminal of claim 22, wherein the access terminal is further configured to operate according to a CDMA family of protocols, wherein any given access attempt message is an access probe, wherein the particular access attempt message is a particular access probe for responding to the received particular response-expected message, wherein the air interface communication link to the base station comprises an access channel for transmissions from the access terminal to the base station, wherein the access channel is configured for transmissions during successive access channel slots, and wherein transmitting the particular access attempt message on an air interface communication link to the base station comprises transmitting the particular access probe on the access channel during one access channel slot.

24. The access terminal of claim 23, wherein the plurality of response-expected messages is arranged in the compound message in an order from a first response-expected message to a last response-expected message, and the particular response-expected message occupies a particular place in the order, wherein the first backoff delay is computed in terms of an integer number of access channel slots, and the test delay is equal to one access channel slot, wherein selecting the backoff range based on the determination comprises setting the backoff range to an integer range between a minimum integer number and a maximum integer number, both the minimum integer number and the maximum integer number being selected based on the particular place in the order, and wherein selecting both the particular range and particular threshold number in the particular range based on the determination comprises selecting both the particular range and particular threshold number in the particular range based on the particular place in the order.

25. The access terminal of claim 23, wherein the particular access probe is an initial access probe in a first sequence of access probes each transmitted by the access terminal in response to the received particular response-expected message, the first sequence of access probes being ordered from the initial access probe to a final access probe, wherein transmitting the particular access probe comprises transmitting the initial access probe, and wherein the access terminal further comprises:

means for computing a second backoff delay according to the backoff algorithm that is based on the determination, and computing a second persistence delay according to the persistence algorithm that is based on the determination; and means for waiting a second total delay time equal to at least the sum of the second backoff delay and the second persistence delay, and after waiting the second total delay time, transmitting an access probe in response to the received particular response-expected message.

26. The access terminal of claim 19, wherein the air interface communication link to the base station comprises an available number of access channels for transmissions from the access terminal to the base station, wherein making the determination that the particular response-expected message was received in the compound message comprises determining how many total response-expected messages are in the plurality of response-expected messages, and wherein transmitting the particular access attempt message on an air interface communication link to the base station comprises:

determining the available number of access channels based on how many total response-expected messages are in the plurality of response-expected messages;

selecting one access channel from among the available number of access channels; and transmitting the particular access attempt message on the selected access channel.

* * * * *